United States Patent Office 3,458,039
Patented July 29, 1969

3,458,039
METHOD OF ELECTROSTATIC DRESSING OF POTASSIUM SALTS AND THE LIKE
Arno Singewald, Wathlingen uber Celle, Germany, assignor to Wintershall Aktiengesellschaft, Kassel, Germany
No Drawing. Filed Nov. 22, 1966, Ser. No. 596,065
Int. Cl. B03c 7/02
U.S. Cl. 209—9                                    6 Claims

ABSTRACT OF THE DISCLOSURE

Method of electrostatic separation of potassium and sodium salts includes the withdrawal from a salt mine of air substantially unchanging temperature having a substantially constant and relatively low moisture content and heating said air to obtain a desired relative humidity. The electrostatic separation is carried out in the presence of the thus treated withdrawn air.

---

The present invention relates to an improvement of methods of electrostatically dressing potassium salts and the like.

It is known to carry out electrostatic dressing of particulate mixtures of minerals, which preferably were preconditioned in conventional manner by treating with fatty acid or the like, by passing particles of the mineral, for instance subdivided potassium or sodium salts of differing composition, through an electrostatic field so that particles, for instance the particles of a potassium salt mixture containing a higher concentration of potassium (generally expressed as the equivalent of $K_2O$), will be drawn towards one of the electrodes of opposite polarity between which the electrostatic field is formed. It is well known that the extent of separation or dressing of the original mixture of mineral particles into a portion of higher concentration of the desired composition and into a portion of lower concentration thereof depends greatly on the relative humidity or the moisture content of the atmosphere in which the electrostatic separation is carried out. Only within a limited range of relatively low humidity will the separation or dressing proceed as desired. Within each range of moisture content, a certain temperature range is to be maintained in order to obtain optimum dressing or separation.

The optimum range of moisture content and temperature depends in each case on the type and quality of the material which is to be subjected to electrostatic dressing.

It is therefore important to carry out the electrostatic separation in an atmosphere of controlled and predictable moisture content.

For this purpose, it has been proopsed to remove moisture from the atmosphere prior to introducing the same into the electrostatic dressing station or the like, for instance by drying the air with adsorbing agents such as activated carbon or silica gel, or by means of drying agents which are capable of chemically binding water, such as $CaCl_2$.

However, this pretreatment of the air which will form the atmosphere in the electrostatic dressing device requires separate installations and is connected with operating expenses which, particularly in the dressing of crude potassium salts and mineral sodium chloride greatly reduce the economic feasibility of the electrostatic dressing process.

For instance, German Patent 1,178,382 proposes such a drying of the air whereby the water vapor content of the air which is to form the atmosphere in the electrostatic dressing device should be below 60% and preferably below 40% of the vapor pressure of a saturated aqueous solution of the mineral which is to be subjected to electrostatic separation.

The effect of exposure to air of low moisture content generally is the same as that of a thermal treatment. According to the latter, the relative humidity which is required in the atmosphere maintained in the electrostatic dressing device is adjusted from a given initial value to the desired value by variations of the temperature.

For instance, in the case of sylvite the optimum conditions for electrostatic separation are found in an atmosphere of between 8% and 18% relative humidity which may be obtained in the case of an absolute humidity of 15 grams per cubic meter by heating the air to above 50° C.

Great difficulties and complications are experienced in carrying out electrostatic separation of, for instance, potassium salts or sodium chloride minerals if the moisture content of the ambient air which eventually will form the atmosphere within the electrostatic separating or dressing device, varies within a wide range. The variations of absolute humidity or moisture content of ambient air depend significantly on the season. Thus, generally, the absolute water content of air expressed in grams of water per cubic meter of air will be during the winter season between 3 and 6, during the spring between 5 and 16, in the summer between 6 and 20, and during fall between 5 and 12.

Of even greater importance are the variations in the relative humidity which occur within a 24-hour cycle.

Thus, it was found, for instance, that within a twenty-four period the relative humidity, expressed in percent, varied between 95 and 64, in the following manner:

| Time: | Relative humidity, percent |
|---|---|
| Midnight | 80 |
| 2:00 a.m. | 88 |
| 3:00 a.m. | 93 |
| 4:00 a.m. | 94 |
| 6:00 a.m. | 95 |
| 7:00 a.m. | 94 |
| 8:00 a.m. | 86 |
| 10:00 a.m. | 79 |
| 11:00 a.m. | 69 |
| Noon | 66 |
| 1:00 p.m. | 86 |
| 2:00 p.m. | 74 |
| 3:00 p.m. | 72 |
| 4:00 p.m. | 64 |
| 6.00 p.m. | 66 |
| 8:00 p.m. | 68 |
| 9:00 p.m. | 88 |
| 10:00 p.m. | 80 |
| 11:00 p.m. | 82 |

It is immediately apparent that the degree of preconditioning of the ambient air which has to be carried out in order to have available for the electrostatic dressing an atmosphere of desired and unchanging moisture content, must be carefully controlled and varies with the seasons as well as within each individual working day.

It is therefore an object of the present invention to overcome the above-discussed difficulties and disadvantages, by providing for the electrostatic separation of particulate material, especially potassium salts and sodium chloride minerals in an atmosphere of optimum or desired moisture content.

It is another object of the present invention to provide a method for the electrostatic dressing of subdivided potassium and sodium salts which will permit the carrying out of the dressing or separation in an atmosphere of constant and desirable low moisture content and which can be carried out in a simple and highly economical manner.

Other objects and advantages of the present invention will become apparent from a further reading of the description and of the appended claims.

With the above and other objects in view, the present invention contemplates in a method of electrostatically dressing subdivided potassium and sodium salts, the steps of subjecting a subdivided potassium or sodium salt to electrostatic dressing at an electrostatic dressing station, withdrawing air from a salt mine shaft, the withdrawn air being of relatively low and constant moisture content, and supplying at least a portion of the thus withdrawn air to the electrostatic dressing station so that electrostatic dressing of the salt is carried out in an atmosphere consisting essentially of the withdrawn air of low and constant moisture content.

Thus, according to the present invention, the effort and expense involved in adjusting ambient air of varying moisture content to the desired constant and relatively low humidity or moisture content which is desirable in a given electrostatic separation of the particulate material, is eliminated or greatly reduced by utilizing a constantly available supply of air of substantially unchanging temperature having a constant and generally relatively low moisture content. By proceeding in accordance with the present invention, the expense of the operation of the air drying installation and of providing the drying agent, etc., will be avoided, since the air withdrawn from the mineshaft is of the desired unchanging and relatively low humidity and is always available. Thus, the economy of electrostatic separation of particulate material, especially potassium salts and mineral sodium chloride, is greatly improved by proceeding in accordance with the present invention.

Experiments have shown that, for instance, the air withdrawn from two shafts of a German potassium salt mine was of substantially unchanging temperature and relative humidity throughout the entire year 1965, as shown in the following table.

| Month | Shaft I °C. | Shaft I Rel. humidity, percent | Shaft II °C. | Shaft II Rel. humidity, percent |
|---|---|---|---|---|
| January | 32 | 39 | 32 | 37 |
| March | 34 | 36 | 32 | 37 |
| May | 33 | 37 | 30 | 38 |
| July | 33 | 38 | 30 | 39 |
| September | 32 | 38 | 31 | 38 |
| November | 31 | 39 | 32 | 38 |

In the given case, air is withdrawn from the two shafts at a rate of about 5000 m.³/min., which is more than ample for supplying the atmosphere for the electrostatic dressing station.

The process of the present invention is preferably carried out by comminuting the crude salt which is to be subjected to electrostatic dressing, preferably chemically conditioning the same in conventional manner, and thereafter contacting the comminuted mixture with air of the desired relative humidity. A stream of the particulate mass of comminuted salt particles in such air of optimum relative humidity is then passed through a high voltage electrostatic field formed between two electrodes of opposite polarity.

More specifically, the process of the present invention may be carried out by treating the comminuted crude salt in conventional manner with low molecular fatty acids under intensive mixing. Thereafter, the thus pretreated crude particulate mass is heated in a conventional drying drum into which is introduced air withdrawn from the salt mine shaft and having a temperature of about 33° C. and a relative humidity of 38%, corresponding to 13 grams of water per cubic meter absolute humidity. This air, obtained as described from the mineshaft, is heated to about 90° C. in order to have the desired optimum relative humidity of about 4%. The relative humidity of the air withdrawn from the mineshaft is 38% at an air temperature of 33° C., corresponding to an absolute humidity of 13 grams per cubic meter. After the thermal treatment, i.e., a heating of the air to 90° C., the relative humidity thereof will be about 4% taking into consideration the additional water which is introduced by combustion of oil and conditioning of the salt particles, which additional water amounts to about 3.5 grams per cubic meter.

The results achieved in the electrostatic separation, which otherwise is carried out in per se conventional manner, by utilizing air of constant relative humidity and temperature as withdrawn from the mineshaft and which then has been heated as described above, are shown in the tables below and compared with the results obtained by using ambient air which had been conditioned in conventional manner. The samples which were analyzed were withdrawn over a period of twenty-four hours at equal time intervals. It will be seen that apart from the greater economy of the process of the present invention, also frequently a certain improvement is achieved in the effectiveness of the electrostatic separation.

By operating in conventional manner, the yield, based on $K_2O$ as well as the concentration thereof, varies greatly, however, these variations do not occur by utilizing, in accordance with the present invention, the air withdrawn from a salt mineshaft for preparation of the atmosphere in the electrostatic separating station.

DRESSING OF SYLVITE CONTAINING 13.7% $K_2O$
[Conventional method]

| Concentrate, percent $K_2O$ | Residue, percent $K_2O$ | Yield of $K_2O$, percent |
|---|---|---|
| 59.1 | 2.6 | 84.7 |
| 59.8 | 2.0 | 88.4 |
| 60.4 | 1.8 | 89.6 |
| 61.0 | 1.6 | 90.7 |
| 60.0 | 2.5 | 85.3 |
| 59.7 | 2.3 | 86.5 |
| 60.9 | 1.8 | 89.6 |
| 60.8 | 1.5 | 91.3 |

[By utilizing air withdrawn from a mineshaft in accordance with the present invention]

| Concentrate, percent $K_2O$ | Residue, percent $K_2O$ | Yield of $K_2O$, percent |
|---|---|---|
| 60.8 | 1.5 | 91.3 |
| 60.6 | 1.4 | 91.9 |
| 61.0 | 1.6 | 90.7 |
| 60.6 | 1.5 | 91.3 |
| 60.4 | 1.5 | 91.3 |
| 60.5 | 1.6 | 90.7 |
| 61.0 | 1.6 | 90.7 |
| 60.1 | 1.5 | 91.3 |

DRESSING OF HARD SALT CONTAINING 13.1% $K_2O$
[Conventional method]

| Concentrate, percent $K_2O$ | Residue, percent $K_2O$ | Yield of $K_2O$, percent |
|---|---|---|
| 58.9 | 2.0 | 87.7 |
| 58.4 | 1.9 | 88.3 |
| 56.7 | 2.1 | 87.2 |
| 57.3 | 2.3 | 85.8 |
| 58.0 | 2.3 | 85.9 |
| 58.7 | 1.9 | 88.2 |
| 58.4 | 1.7 | 89.2 |
| 55.9 | 2.1 | 87.3 |

[By utilizing air withdrawn from a mineshaft in accordance with the present invention]

| Concentrate, percent $K_2O$ | Residue, percent $K_2O$ | Yield of $K_2O$, percent |
|---|---|---|
| 58.7 | 1.9 | 88.2 |
| 58.7 | 2.0 | 87.7 |
| 58.1 | 1.9 | 88.3 |
| 58.6 | 1.9 | 88.2 |
| 58.4 | 1.9 | 88.4 |
| 58.9 | 2.0 | 87.7 |
| 58.0 | 1.9 | 88.4 |
| 58.2 | 2.0 | 87.8 |

It will be understood from the data given above that the present invention does not only result in a more economical process but also in obtaining constant working conditions close to the optimum and this will result in a high yield of highly concentrated dressed salts.

The utilization of the moisture-unsaturated air withdrawn from the mineshaft which has nearly constant relative and absolute humidity, not affected by variations in the weather and the ambient temperature, is to some extent based on the surprising finding that the humidity and moisture content as well as the temperature of the withdrawn air shows so very little variation over the entire year, as well as over any given twenty-four hour period.

Thus, the present invention provides for the utilization of an up to now useless waste gas as a valuable effective and highly economical auxiliary material for carrying out the electrostatic separation.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The process of the electrostatic separation of potassium and sodium crude salts comprising the steps of:
    (a) comminuting the crude salt;
    (b) treating it with a chemical conditioning agent;
    (c) withdrawing air from a salt mine where said air has a substantially constant annual average relative humidity of about 36 to 39 percent and a temperature of about 30 to 34° C.;
    (d) heating said air to a temperature where its relative humidity is reduced to between 4 and 18 percent;
    (e) passing the comminuted salt mass in a stream of said air through a high voltage electrostatic separator so as to obtain a high concentrate of sodium or potassium salt.

2. The process of claim 1 wherein the crude salt is sylvenite, the concentrate contains about 60 percent $K_2O$, the residue contains up to about 1.6 percent $K_2O$ and the total yield is about 90 percent in terms of $K_2O$.

3. The process of claim 1 wherein the crude salt is hartsalz, the concentrate contains about 58 percent $K_2O$, the residue contains up to about 2 percent of $K_2O$ and the total yield is about 88 percent in terms of $K_2O$.

4. The process of claim 1 wherein the chemical conditioning agent comprises low molecular fatty acids and wherein said conditioning agent is thoroughly mixed with the crude salt.

5. The process of claim 1 wherein the heating of the air is effected in the presence of said comminuted mass prior to said electrostatic separating step.

6. The process of claim 1 wherein the said air is withdrawn from the shaft of a sodium or potassium salt mine.

References Cited

UNITED STATES PATENTS

| | | | |
|---|---|---|---|
| 2,180,804 | 11/1939 | Fahrenwald | 209—127 |
| 3,225,924 | 12/1965 | Autenrieth | 209—9 |

OTHER REFERENCES

Autenrieth, German application 1,092,401, Nov. 10, 1960 (KL 1b 6), 209/127.

Finn, German application 1,095,222, Dec. 22, 1960 (KL 1b 6), 209/127.

German application 1,178,382, Sept. 24, 1964 (KL 1b 6) 209/127.

"Domestic Engineering," W. W. Stevens, vol. 129, No. 7, Dec. 28, 1929, Engineering Publications, Inc., Chicago; pp. 43–46 and 158; TH–6101–D66. Sci. Lib.

FRANK W. LUTTER, Primary Examiner

U.S. Cl. X.R.

209—11, 127